US005267307A

United States Patent [19]

Izumi et al.

[11] Patent Number: 5,267,307

[45] Date of Patent: Nov. 30, 1993

[54] COMMUNICATION APPARATUS

[75] Inventors: Michihiro Izumi, Yokohama; Shoichi Takashima, Tokyo, both of Japan

[73] Assignee: Canon Kabushiki Kaisha, Tokyo, Japan

[21] Appl. No.: 715,020

[22] Filed: Jun. 13, 1991

Related U.S. Application Data

[63] Continuation of Ser. No. 363,860, Jun. 9, 1989, abandoned.

[30] Foreign Application Priority Data

| | | | |
|---|---|---|---|
| Jun. 13, 1988 | [JP] | Japan | 63-143761 |
| Jun. 27, 1988 | [JP] | Japan | 63-156931 |
| Aug. 15, 1988 | [JP] | Japan | 63-201933 |
| Dec. 1, 1988 | [JP] | Japan | 63-304664 |

[51] Int. Cl.[5] .......... H04M 1/64

[52] U.S. Cl. .......... 379/354; 379/355; 379/201; 379/210

[58] Field of Search .......... 379/354, 355, 201, 210, 379/211, 212

[56] References Cited

U.S. PATENT DOCUMENTS

| | | | |
|---|---|---|---|
| 4,266,098 | 5/1981 | Novak . | |
| 4,277,649 | 7/1981 | Sheinbein . | |
| 4,304,968 | 12/1981 | Klausner et al. | 379/355 |
| 4,451,705 | 5/1984 | Burke et al. | 379/211 |
| 4,567,323 | 9/1986 | Lottes et al. | 379/201 |
| 4,672,660 | 6/1987 | Curtin . | |
| 4,674,115 | 6/1987 | Kaleita et al. | 379/211 |
| 4,709,387 | 11/1987 | Masuda | 379/355 |
| 4,723,273 | 2/1988 | Diesel et al. | 379/211 |
| 4,802,202 | 1/1989 | Takahashi et al. . | |
| 4,817,133 | 3/1989 | Takahashi et al. | 379/355 |
| 4,894,861 | 1/1990 | Fujioka | 379/374 |

FOREIGN PATENT DOCUMENTS 3128529 2/1983 Fed. Rep. of Germany .

*Primary Examiner*—James L. Dwyer
*Assistant Examiner*—M. W. Shehata
*Attorney, Agent, or Firm*—Fitzpatrick, Cella, Harper & Scinto

[57] ABSTRACT

A communication apparatus includes a memory for storing extension number information or transfer destination information in association with calling party number information, a unit for receiving calling party number information sent from a calling party at a called party, a unit for comparing the calling party number information received by the receiving unit with the calling party number information stored in the memory; and a unit for notifying a call reception to an extension terminal equipment identified by the extension number information associated with the calling party number information received by the receiving unit, or transferring a call reception to the transfer destination associated with the calling party number information received by the receiving unit, respectively, in accordance with the comparison result by the comparing unit.

4 Claims, 18 Drawing Sheets

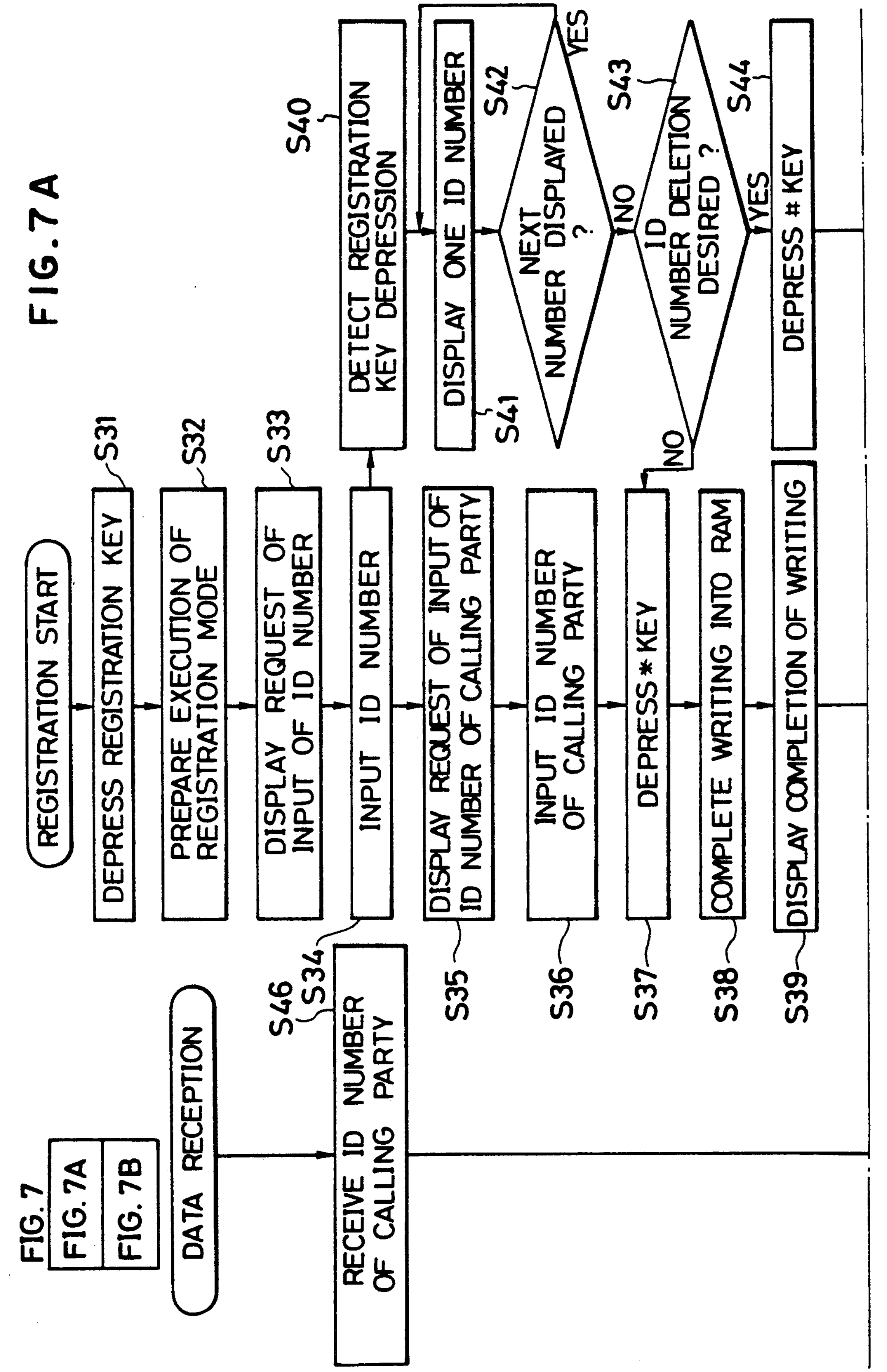

FIG. 7A

| FIG. 7 |
|---|
| FIG. 7A |
| FIG. 7B |

REGISTRATION START
→ DEPRESS REGISTRATION KEY (S31)
→ PREPARE EXECUTION OF REGISTRATION MODE (S32)
→ DISPLAY REQUEST OF INPUT OF ID NUMBER (S33)
→ INPUT ID NUMBER (S34)
→ DISPLAY REQUEST OF INPUT OF ID NUMBER OF CALLING PARTY (S35)
→ INPUT ID NUMBER OF CALLING PARTY (S36)
→ DEPRESS * KEY (S37)
→ COMPLETE WRITING INTO RAM (S38)
→ DISPLAY COMPLETION OF WRITING (S39)

From S33 branch:
DETECT REGISTRATION KEY DEPRESSION (S40)
→ DISPLAY ONE ID NUMBER (S41)
→ NEXT NUMBER DISPLAYED ? (S42) — YES loops back to S41
  NO →
ID NUMBER DELETION DESIRED ? (S43)
  YES → DEPRESS # KEY (S44)
  NO → (to S37)

DATA RECEPTION
→ RECEIVE ID NUMBER OF CALLING PARTY (S46)

FIG. 8

| ID NO. | IDENTIFICATION NUMBER |
|---|---|
| 02 | 441-3232 |
| 01 | 123-4567 |
| 01 | 211-3525 |
| 03 | 323-1414 |
| 02 | 757-6242 |
| 01 | 758-2111 |
| | |
| | |
| | |

| ID NO. | IDENTIFICATION NUMBER | ONE-TOUCH KEY |
|---|---|---|
| 02 | 441 3232 | 1 |
| 01 | 123 4567 | 2 |
| 01 | 211 3525 | 3 |
| 03 | 323 1414 | 4 |
| 02 | 757 6242 | 5 |
| 01 | 758 2111 | 6 |
| | | |
| | | |
| | | |

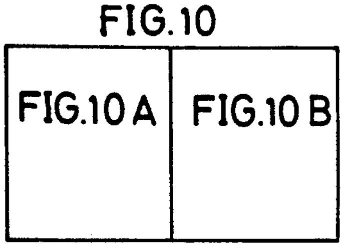
FIG.10A
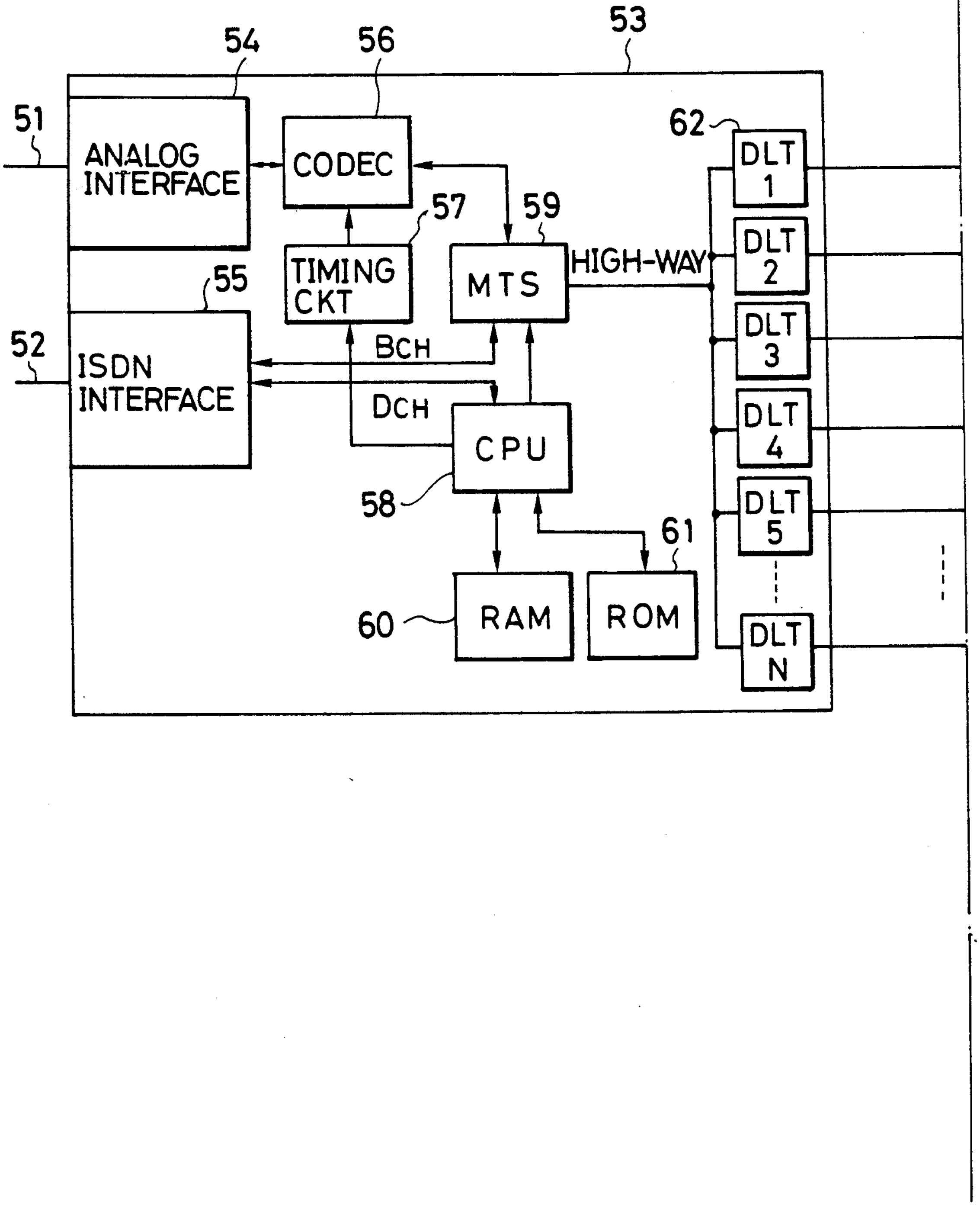

FIG.11

| DESTINATION NAME DATA (77) | NUMBER DATA (78) |
|---|---|
| キャナン | 03-758-2111 |
| | 03-455-9111 |
| | |
| | |
| | |

FIG.12

| | | |
|---|---|---|
| 1<br>ア～オ | 2<br>カ～コ | 3<br>サ～ソ |
| 4<br>タ～ト | 5<br>ナ～ノ | 6<br>ハ～ホ |
| 7<br>マ～モ | 8<br>ヤ～ヨ | 9<br>ラ～ロ |
| ＊<br>RETURN | 0<br>ワ，ン | ＃<br>ONE CHARACTER REVERSE |

FIG.16

| | CALLING PARTY NUMBER | RINGING EXTENSION NUMBER | | | | | |
|---|---|---|---|---|---|---|---|
| 101 | 1 2 3 4 5 6 7 | 1 | 2 | 3 | 4 | 5 | 104 |
| 102 | 9 8 7 6 5 4 3 | 5 | — | — | — | — | 105 |
| 103 | 9 9 9 9 9 9 9 | 1 | 2 | — | — | — | 106 |
| | ⋮ | ⋮ | | | | | |

FIG. 18

| | CALLING PARTY NUMBER | TRANSFER DESTINATION NUMBER | |
|---|---|---|---|
| 111 | 12345678 | 15551111 | 114 |
| 112 | 14321111 | 15551111 | 115 |
| 113 | 19876545 | 19995555 | 116 |
| | ⋮ | ⋮ | |

COMMUNICATION APPARATUS

This application is a continuation of application Ser. No. 07/363,860 filed Jun. 9, 1989 now abandoned.

BACKGROUND OF THE INVENTION

1. Field of the Invention

The present invention relates to a communication apparatus for voice data, image data, code data or the like, and more particularly to a communication apparatus connected to a communication network having a function to transmit information for discriminating a calling party.

2. Related Background Art

A conventional analog telephone network is not provided with a function to notify a called party of information for discriminating a calling party, e.g., a telephone number of a calling party. An integrated Service Digital Network (ISDN) can transmit a discrimination number of a calling party to a called party. As an example of utilizing such a discrimination number, there has been proposed to display the calling party telephone number received from the network on the called party terminal equipment. The present applicant has filed U.S. patent applications Ser. Nos. 151,309, 283,857, 283,852, and 307,506 relevant to the ISDN.

The above-described terminal equipment connected to the ISDN simply displays a calling party number. Therefore, an operator knowing the number can only discriminate the calling party. From this point of view, display of the calling party number does not give any particular advantage over a conventional analog telephone network.

Even with such display under the ISDN service, a user must mentally prepare for responding to an optical calling party. In addition, if terminal equipment is used by a plurality of persons, since only a person knowing the number can discriminate the calling party, an unknowledgeable person may respond to the call unnecessarily, thus posing a problem of wasteful call response.

The connection method used by an exchange such as a private branch exchange (PBX) or a key telephone set (KTS) includes a call reception ringing method which connects a call to each extension within the service area and a call reception transfer method which transfers a call to another office line. The present applicant has filed U.S. patent applications Ser. Nos. 270,208 and 250,222 in connection with KTS.

As the call reception ringing method for PBX and KTS by which, upon detection of a call from the external line, it is determined which extension or extensions are to be rung, there are a concentrated call reception method and a distributed call reception method. With the former method, a single extension is registered previously for each external line accommodated within an exchange so that the inner lines can be controlled based on the external line receiving a call. With the latter method, a call is distributed to a plurality of internal lines previously designated for each external line. There is also known a dial-in service whereby a call is sent to a single internal line in accordance with a selection signal received from a central office after detection of a call.

With the known call reception transfer method, call reception is temporarily suspended, and after another external line is established, a predetermined telephone number is sent via the established external line. After detecting a response from the external line, it is connected to the suspended call reception external line to conduct speech communication.

The above conventional methods do not suggest to discriminate a calling party. Therefore, in the distributed call reception method, for example, a plurality of extensions previously registered are rung, which extensions will include those not associated with the calling party.

Further, in the call reception transfer method, a call is transferred to a transfer destination previously registered irrespective of who is the calling party. Therefore, an unnecessary call is transferred to the transfer destination telephone which is rung wastefully.

SUMMARY OF THE INVENTION

It is an object of the present invention to provide a communication apparatus eliminating the above-described prior art disadvantages.

It is another object of the present invention to provide a communication apparatus capable of providing various services by using calling party number information sent from a calling party apparatus and received at a called party.

It is a further object of the present invention to provide a communication apparatus capable of discriminating, simultaneously with call reception, if the calling party is a known person or not.

To achieve the above objects, the embodiment of the present invention comprises memory means for storing specific number information; means for discriminating calling party number information sent from a calling party apparatus; means for comparing the calling party number information discriminated by said discriminating means with the specific number information stored in said memory means; and means for notifying a comparison result by said comparing means.

It is another object of this invention to provide a communication apparatus capable of generating a call reception notice corresponding to an attribute of calling party number information upon reception of a call, e.g., capable of generating a call reception notice different for each called party.

To achieve the above object, the embodiment of this invention comprises memory means for storing calling party information in association with a predetermined attribute; means for comparing the calling party information sent from a calling party and received at a called party with said calling party information stored in said memory means and discriminating said attribute of said received calling party information; and means for generating a reception notice corresponding to said attribute discriminated by said discriminating means.

It is another object of the present invention to provide a communication system capable of displaying name information corresponding to calling party number information upon reception of a call.

It is a further object of the present invention to provide a communication apparatus capable of selectively connecting a call to a called party corresponding to calling party number information.

To achieve the above objects, the embodiment of this invention comprises memory means for storing extension number information in association with calling party number information; means for receiving calling party number information sent from a calling party at a called party; means for comparing the calling party number information received by said receiving means with said calling party number information stored in said memory means; and means for notifying call reception to extension terminal equipment identified by said extension number information associated with the calling party number information received by said receiving means, in accordance with the comparison result of said comparing means.

The embodiment of this invention also comprises memory means for storing transfer destination number information in association with calling party number information; means for receiving calling party number information sent from a calling party at a called party; means for comparing the calling party number information received by said receiving means with said calling party number information stored in said memory means; and means for transferring a call reception to the transfer destination associated with the calling party number information received by said receiving means, in accordance with the comparison result by said comparing means.

BRIEF DESCRIPTION OF THE DRAWINGS

FIGS. 7A and 7B are a flow chart showing the control procedure executed by the CPU shown in FIG. 5;

FIGS. 8 and 9 show the formats of RAM partially changed from the formats shown in FIGS. 6A and 6B;

FIGS. 10A and 10B are a block diagram showing a key telephone set according to a third embodiment of this invention;

FIG. 11 conceptually illustrates the registration table according to the third embodiment of this invention;

FIG. 12 shows ten-keys of an extension telephone set according to the third embodiment of this invention;

FIG. 16 shows the data format of a memory in a call reception ringing system according to the fourth embodiment of this invention;

FIG. 18 shows the data format of a memory in a call reception transfer system according to the fourth embodiment of this invention.

DETAILED DESCRIPTION OF THE PREFERRED EMBODIMENTS

Preferred embodiments of this invention will be described in detail with reference to the accompanying drawings.

[First Embodiment]

Figure 2:
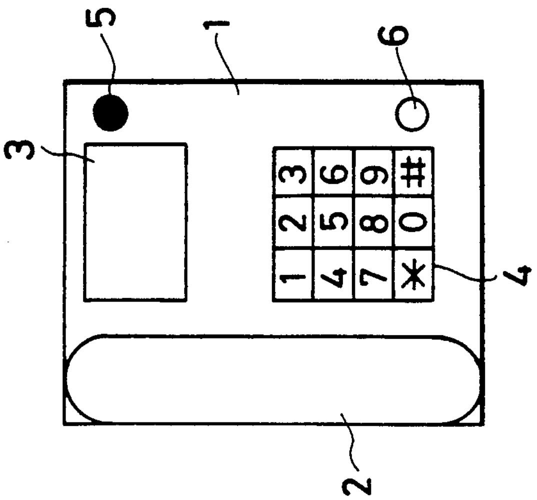
FIG. 2 shows a front view of a telephone set used for the first embodiment.
Figure 1:
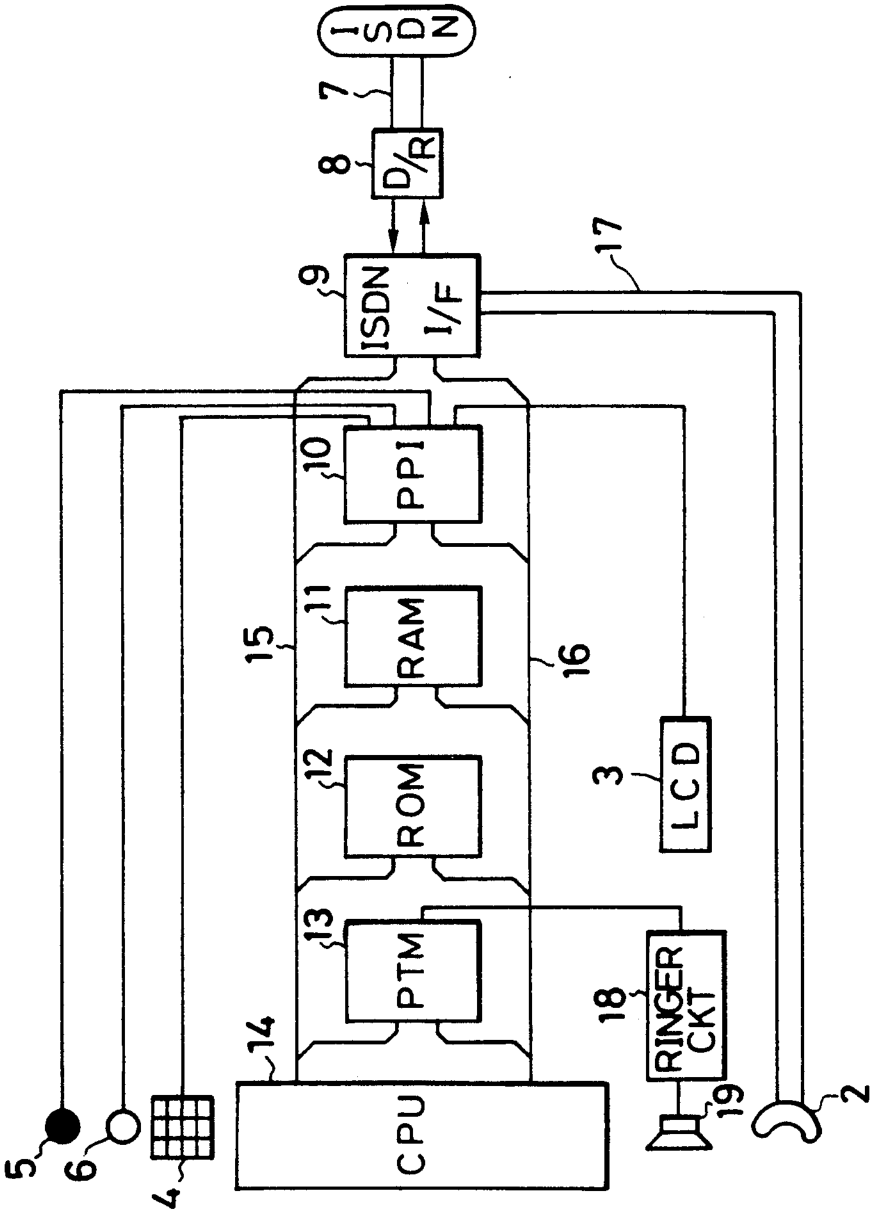
FIG. 1 is a block diagram showing a first embodiment of this invention.

FIG. 1 is a block diagram showing a digital telephone set 1 according to the first embodiment. In FIG. 1, reference numeral 2 represents a handset, 3 a liquid crystal display panel (hereinafter called LCD), 4 dial keys, 5 a light emitting diode (hereinafter called LED) serving as notifying means of this invention, and 6 a registration key used for registering particular telephone number information. Reference number 7 represents integrated system digital network (ISDN) lines, 8 a driver (D/R), 9 an ISDN interface circuit (ISDN I/F), 10 an input/output port (PPI), 11 a RAM for storing a telephone number inputted by using the registration key 6 and dial keys 4, 12 a ROM for storing the control programs to be executed by CPU 14 and described later, 13 a timer (PTM) for generating a pattern of calling sounds, 15 an address bus, 16 a data bus, 17 an ISDN B channel (communication channel), 18 a ringer circuit, and 19 a loudspeaker. FIG. 2 is a front view of the digital telephone set of the first embodiment.

Figure 3:
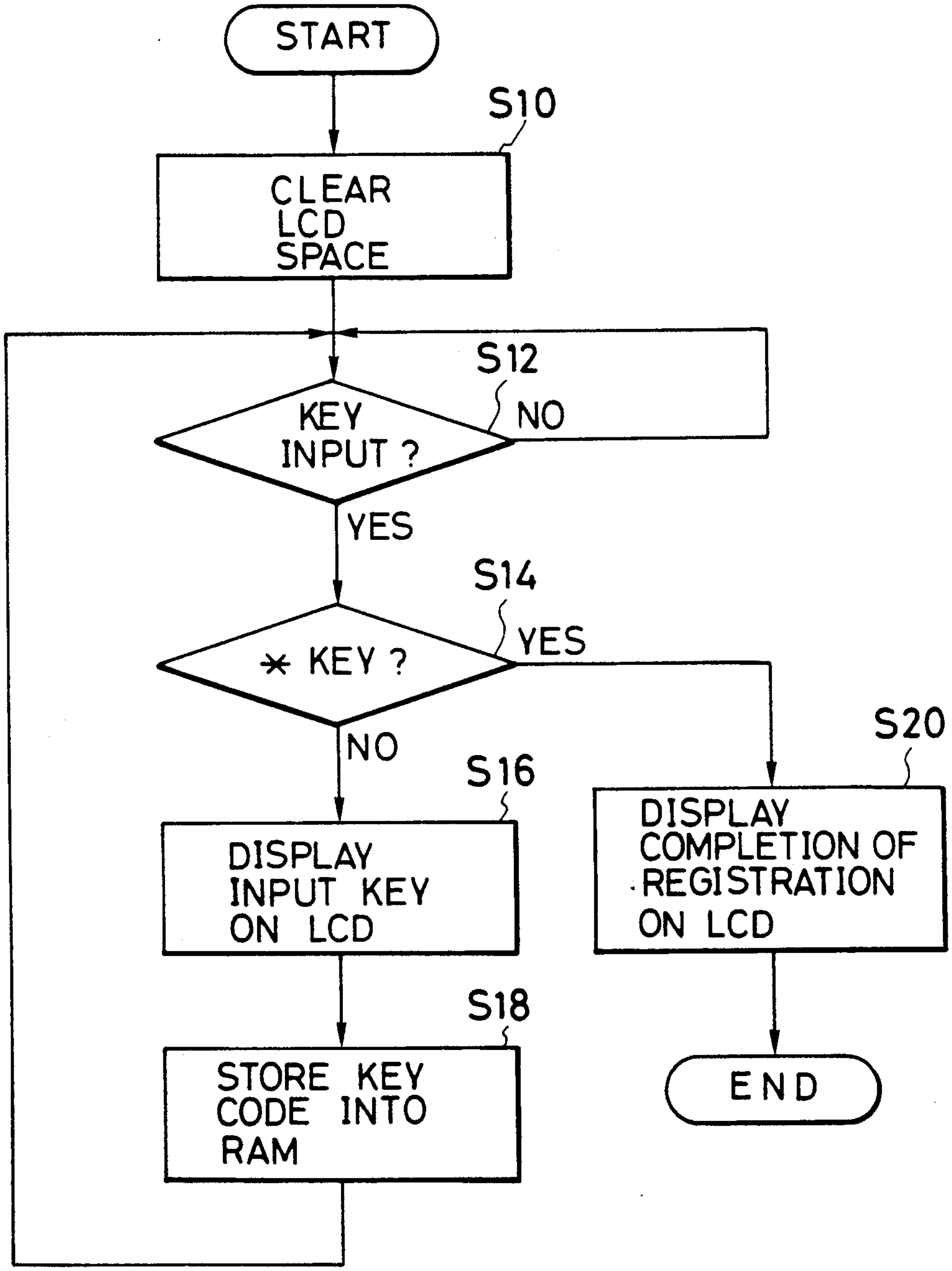
FIG. 3 is a flow chart showing the operation of registering a calling party telephone number according to the first embodiment of this invention.

Next, the operation of registering a telephone number of an intimate friend or the like, which is desired to be discriminated upon call reception, will be described with reference to the flow chart shown in FIG. 3. Programs as illustrated in the flow chart are stored in ROM 12 and executed by CPU 14.

In this embodiment, a telephone number is registered by using the registration key 6 and dial keys 4. First, an operator depresses the registration key 6. PPI 10 detects and notifies CPU 14 which in turn prepares for a registration mode and starts the registration operation. At step S10, a space clear command for clearing LCD 3 is outputted to PPI 10 so that dial numbers to be inputted with the dial keys 4 can be monitored. If a detection of an input from the dial key 4 is notified by PPI 10 at step S12, then at step S14 it is judged if the inputted key is "*" key representing a completion of registration, based on the inputted key code. If not, at step S16 the code of the inputted dial key 4 is outputted to PPI 10. Next, the inputted key code is stored in RAM 11. The above operations are repeated until the registration is completed. Specifically, if a telephone number "123-4567" is to be registered, the dial keys 4 are depressed in the order of "1, 2, 3, 4, 5, 6, and 7", and thereafter "*" key is depressed. Then, in accordance with the judgment at step S14, the flow advances to step S20 whereat a message of completion of registration previously stored in ROM 12 is outputted to PPI 10 to terminate the registration processes.

Figure 4:
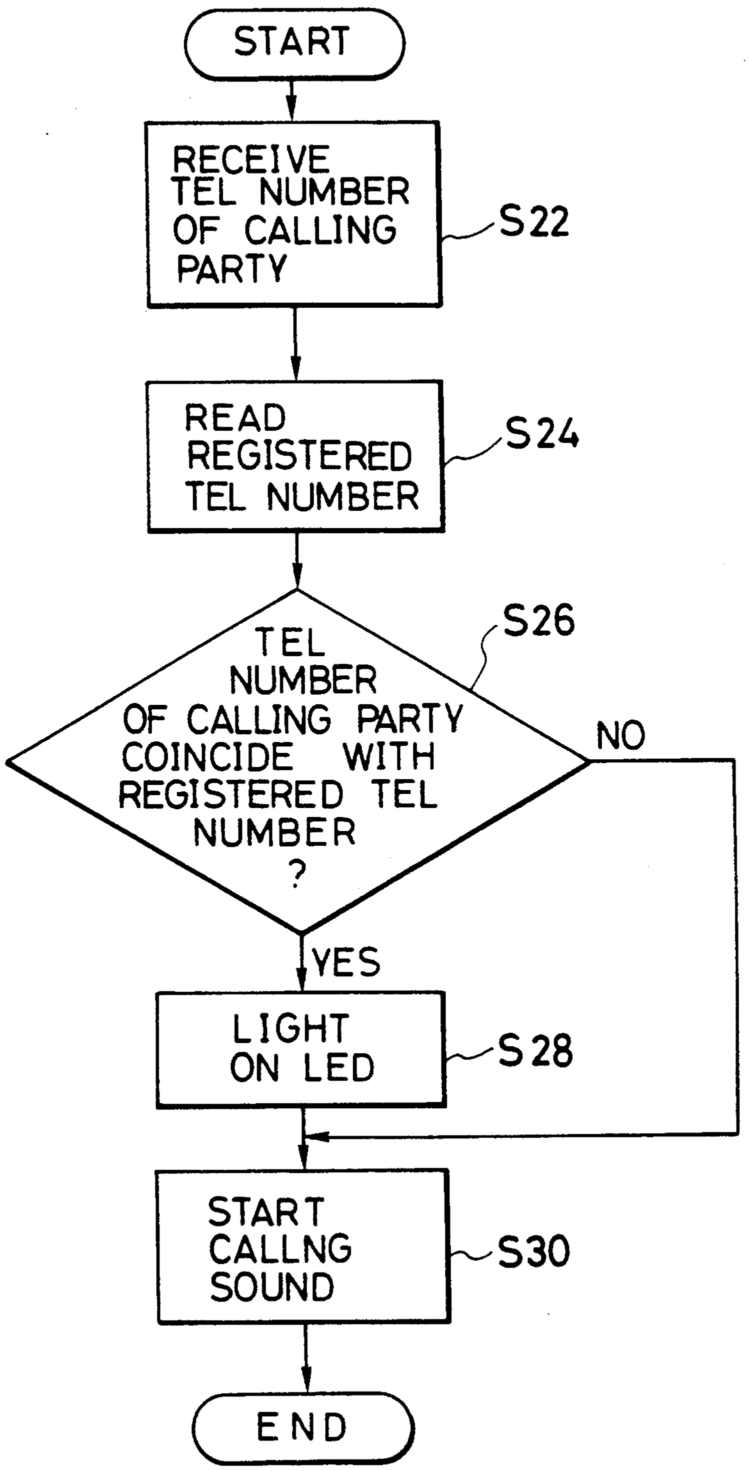
FIG. 4 is a flow chart showing the operation of receiving a call according to the first embodiment of this invention.

The operation of receiving a call in the first embodiment will be described with reference to the flow chart shown in FIG. 4. Upon reception of a call from a calling party, at step S22 ISDN I/F 9 receives the calling party telephone number (originating telephone number information) and notifies CPU 14. At step S24, CPU 14 reads the telephone number registered in RAM 11. At step S26, the received calling party telephone number is compared with the registered telephone number read at step S24. If they are not coincident with each other, the flow advances to step S30. If coincident, data for lighting on LED are outputted to PPI 10 at step S28. At next step S30, PTM 13 is actuated to output a call reception sound pattern to the ringer circuit 18 so that the call reception sound generates from the loudspeaker 19.

As described above, according to the first embodiment, a called party can discriminate at the time of call reception whether or not the calling party is a person the called party knows. Therefore, the called party can mentally prepare for that call.

In the first embodiment, voice terminal equipment has been described by way of example. However, the present invention is also applicable to facsimile terminal equipment, data terminal equipment and the like by using the circuit arrangement show in FIG. 1.

Further, an LED is lighted to discriminate a calling party in the above embodiment. However, a calling party can be discriminated by changing the type of calling sounds.

Furthermore, in the above embodiment, an LED is lighted when the calling party telephone number coincides with the registered telephone number. However, on the contrary the LED may be lighted when they are not coincident with each other.

As described, so far, the originating number information from an originating party is compared with the particular number information stored in memory means, and the comparison result is notified. Therefore, it becomes possible for a called party to discriminate simultaneously with call reception whether or not the calling party is a person the called party knows, thus allowing them to respond only to necessary call reception.

[Second Embodiment]

In the second embodiment, telephone numbers (identification numbers) of calling parties are stored in association with attributes of called parties so that upon call reception, a call reception notice specific to the attribute of the called party can be generated.

Figure 5:
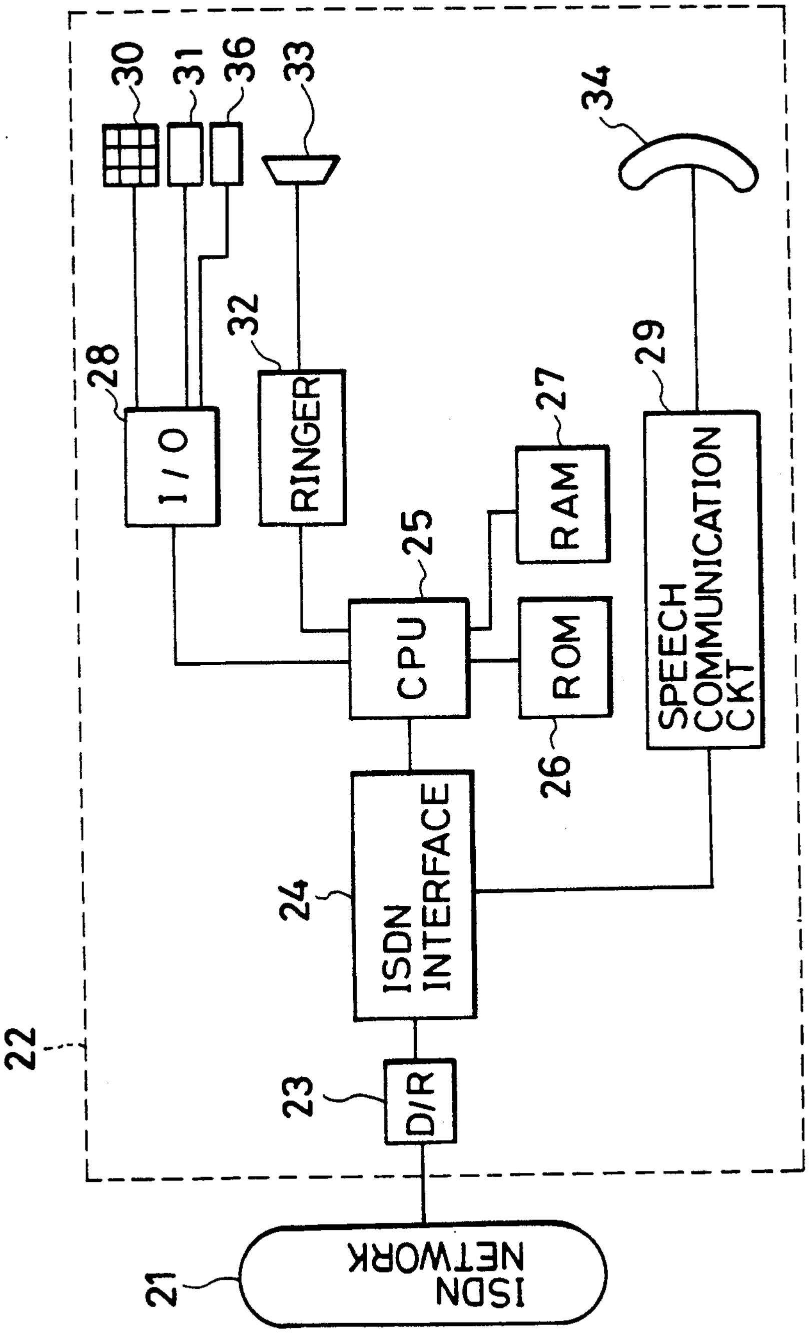
FIG. 5 is a block diagram showing the structure of a digital telephone set according to a second embodiment of this invention.

FIG. 5 shows the structure of a digital telephone set 22 connectable to an ISDN, according to the second embodiment of this invention. In FIG. 5, reference numeral 21 represents an ISDN to which the digital telephone set 22 is connected via a well known driver/-receiver 23. The driver/receiver 23 is connected to an ISDN interface 24 which is connected to a control path including a CPU 25 and to a speech communication circuit 29 constituting an analog signal path for sending and receiving speech to and from handset 34.

CPU 25 is constructed of a microprocessor and the like and controls the operation of the telephone set in accordance with control programs stored in a ROM 26 to be described later. CPU 25 is connected to a RAM 27 which stores therein, as will be described later, identification numbers of the calling parties which are considered likely to call the digital telephone set 22. The telephone set is operated by using a keyboard made of ten-keys 30, function keys 31 and the like. A display 36 made of an LCD panel and the like is provided for outputting various information.

Information on identification numbers inputted from the keyboard and information to be displayed on the display 36 are inputted and outputted to and from CPU 25 via an input/output port 28.

CPU 25 is also connected to a ringer 32 which generates a calling sound upon call reception. In this embodiment, the ringer 32 is adapted to generate a plurality of calling sounds discriminable in accordance with the sound tone, ringing pattern or the like. A calling sound generated by the ringer 32 is outputted to a loudspeaker 33.

Figure 6A:
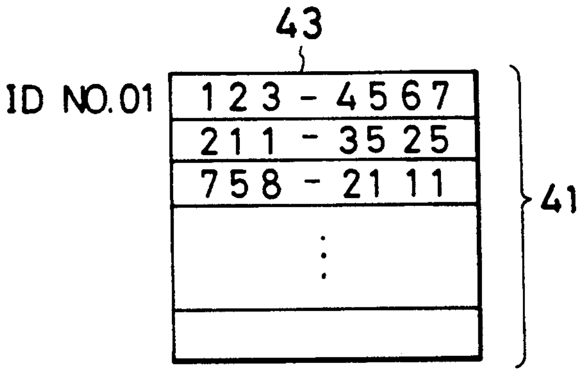
FIGS. 6A and 6B show the formats of RAM shown in FIG. 5.
Figure 6B:
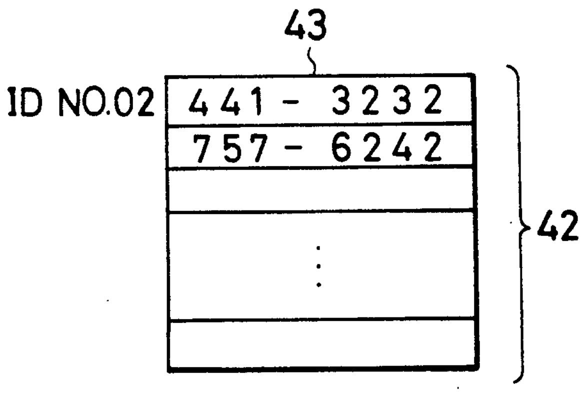

FIGS. 6A and 6B show the formats of RAM 27 in which identification numbers of originating parties (calling parties) which are considered likely to call the telephone set. In FIGS. 6A and 6B, reference numeral 43 represents an identification number of a calling party. The identification number is stored in RAM 27 at a particular memory area 41 or 42 having a predetermined capacity.

The memory capacity per one identification number and the memory capacity of each of the memory areas 41 and 42 are assumed to be fixedly predefined in this embodiment. As shows at the left sides of FIGS. 6A and 6B, the memory areas 41 and 42 are assigned with ID numbers ID 01 and ID 02. The identification numbers of calling parties which are likely to call the telephone set are stored in the two memory areas, while classifying them into two corresponding different ID numbers representing attributes.

The ID numbers may be stored at the top of the memory areas 41 and 42, respectively, or the ID numbers may be discriminated from the start addresses of the memory areas 41 and 42. In FIGS. 6A and 6B, two different ID numbers are used to classify the identification numbers. However, it is apparent that a number of ID numbers may be used. In the following description, it is assumed that five memory areas are provided respectively for ID numbers 01 to 05.

It can be considered that the attributes assigned the originating identification numbers are set for each called party which receives a call on the telephone set. For instance, if two persons are assigned to the telephone set, the ID numbers 01 and 02 shown in FIGS. 6A and 6B are assigned to called parties A and B respectively. The called parties A and B each input from the key board the identification numbers of calling parties to which the called parties desire to respond, while using their own ID numbers, to thereby realize the attribute allocation as shown in FIGS. 6A and 6B.

Figure 7B:
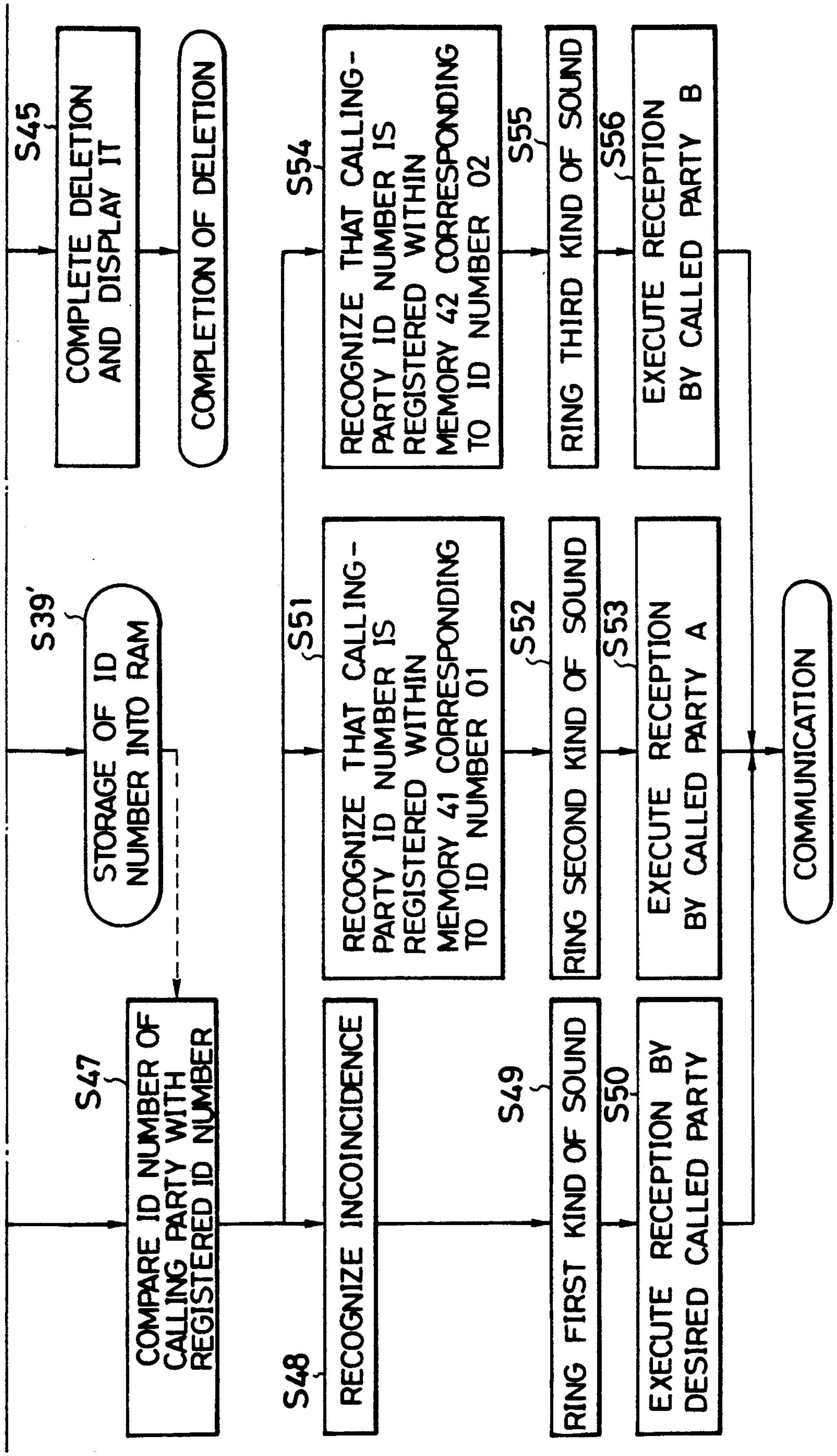

FIG. 7 is a flow chart illustrating the registration operation for a calling party identification number, and the control procedure for a call reception operation. The procedure shown in FIG. 7 is stored in ROM 26 and executed by CPU 25.

In registering the identification number of a calling party to which a particular party should respond, first at step S31 a registration key among the function keys 31 on the keyboard is depressed. Upon depression of the registration key, a memory allocation process and the like necessary for CPU 25 to execute, the registration mode at step S32 are prepared. Further, at step S33, a notice indicating a request for an input of an ID number, such as a notice "Input an ID number" is displayed on the display 36.

Next, at step S34, an ID number of the particular party is inputted by using the ten-keys 30. The called party A and B select a desired one of the ID numbers 01 to 05. It is assumed that the called parties A and B select ID numbers 01 and 02, respectively. For registration by the called party A, after "0" and "1" are inputted, "*" is inputted to terminate inputting the ID number.

At step S35, CPU 25 requests an input of identification numbers of calling parties to which the called party should respond, by using the display 36 with a notice "Input Identification Numbers" for example being displayed.

At step S36, the called party inputs the identification numbers of customers, friends or the like to which the called party wants to respond by oneself. At step S37, "*" is inputted to terminate the input of one identification number.

Specifically, upon depression of the ten-keys in the order of "1", "2", "3", "4", "5", "6", "7" and "*", the identification number "123-4567" of a calling party is stored as shown in FIG. 6A in RAM 27 at the memory area 41 corresponding to the ID number 01.

After completion of writing into RAM 27 at step S38, a message "Completion of Registration" or the like is displayed on the display 36 at step S39. Step S39' indicates the state where the identification numbers of calling parties are being stored in RAM 27 for respective ID numbers.

The editing processes for monitoring registered identification numbers and deleting a particular identification number are conducted at steps S40 to S45. In particular, if the registration key is depressed after inputting the ID number at step S34, this depression is detected at step S40. At step S41, one of the identification numbers in the memory area 41 or 42 corresponding to the ID number inputted at step S41 is picked up and displayed on the display 36.

This display process is sequentially repeated each time upon detection of an instruction to display the next identification number effected by depressing the registration key for example at step S42. If the instruction to display the next identification number has been effected at step S42, the next identification number (telephone number) is picked up from memory area 41 or 42 and displayed on the display 36.

After displaying the last identification number in the memory area, the display returns to the first identification number and then the following numbers. If the instruction at step S42 is not present, the flow advances to step S43 to judge if an operation to delete the identification number has been performed, by depressing a deletion key among the function keys 41 for example.

If not at step S43 the flow advances to step S37. If affirmative at step S43, a depression of "#" key among the ten-keys 30 is waited at step S44. Upon depression of this key, the identification number displayed at step S45 is deleted from the memory area corresponding to the ID number, and a notice of deletion completion is displayed on the display 36.

With the identification numbers of calling parties being stored in RAM for respective ID numbers, upon call reception from ISDN 21, an identification number of the calling party is received at step S46.

The identification number of the calling party is supplied to CPU 25 via the ISDN interface 24. At step S47, CPU 25 compares the received identification number of the calling party with all the registered identification numbers stored in the memory areas 41 and 42 shown in FIGS. 6A and 6B.

If it is confirmed at step S48 that the comparison result at step S47 shows no coincident identification number, the flow advances to step S49 whereat the ringer 32 is actuated with a first kind of sound. Then, any person can respond to the call with the handset 34 (step S50).

It is assumed that the ringer 32 has three kinds of sound. If it is confirmed at step S51 that the identification number of the calling party received at step S46 is stored in the memory area 41 assigned the ID number 01, then at step S52 the ringer 32 is actuated with the second kind of sound. Upon this kind of sound, the called party A can recognize that the call is directed to himself, and receives the call at step S53 to have a communication. On the other hand, if it is confirmed at step S54 that the identification number of the calling party received at step S46 is present in the memory area 42 assigned the ID number 02, the flow advances to step S55 whereat the ringer 3 is actuated with the third kind of sound. Upon this kind of sound, the called party B can recognize that the call is directed to himself, and receives the call at step S56.

As described above, the identification numbers of calling parties to which the called party wishes to respond are stored in association with the called party ID number. The identification number of the calling party received from the ISDN is compared with the registered identification numbers. If there is the coincident identification number, the ringer is actuated with the kind of sound assigned to the ID number of the memory area in which the coincident identification number is stored. Therefore, the called party can recognize based on the kind of sound to which the call was directed so that the called party for that call can respond first, thus allowing an effective call reception operation.

In the above embodiment, the attribute of the identification number of a calling party is assigned to each called party. It is needless to say that such an attribute may be set in accordance with the degree of importance of customers. As the call notice, the calling sound is used by way of example in the above embodiment. However, if light emitting means such as an LED is used as the means for generating the call notice, the attribute of a calling party can be represented by the color of the emitted light, light flushing timing or the like.

Further, in the above embodiment, there is not provided means for confirming the call notice corresponding to the attribute or ID number of a calling party identification number, prior to the actual call reception. However, after inputting an ID number at step S34 in FIG. 3 for registration of an identification number, a corresponding call notice may be generated to allow the operator to confirm the call notice assigned to the attribute.

In the system for registering an identification number shown in FIGS. 6A and 6B, a fixed memory capacity is provided for each memory area with an ID number. However, if the number of identification numbers differs greatly for respective ID numbers, there arises a problem of inefficient use of memory.

In consideration of the above problem, both the ID number and identification number are sequentially stored in a memory area 24 as shown in FIG. 8. With such an arrangement, the memory space can be used efficiently. In searching the identification number of a calling party, the memory area 24 is sequentially searched starting from the top identification number without using a particular addressing method, thus simplifying the searching of identification numbers.

Furthermore, a particular key number or one-touch key number code for a telephone number together with the ID number may be stored in the memory of this type. With such an arrangement, the same memory can be efficiently used both for discriminating the attribute of the identification number of a calling party and for designating a full length telephone number for the reduced number telephone code.

FIG. 9 shows the memory format with one-touch key code stored in the memory shown in FIG. 8. Upon depression of one-touch key 21 for example among the function keys 11, CPU 25 reads "441-3232" from the memory (RAM 27) shown in FIG. 9 and initiates a call to the ISDN in accordance with the read-out number. Consequently, the memory area can be efficiently used as described above by storing one-touch key information in RAM 27.

Further, in the above embodiment, although the structure of a digital telephone set has been described as an example of terminal equipment, the invention is also applicable to various communication apparatus such as a facsimile apparatus, data communication terminal equipment, and the like.

As appreciated from the foregoing description, according to the second embodiment, a communication apparatus connected to a communication network having a function to transmit, to a called party, information for discriminating a calling party, comprises means for storing a plurality of calling party information in association with particular attributes, and means for generating a plurality of call notices assigned to the respective attributes. In the communication apparatus, calling party information inputted from the communication network upon call reception is compared with the calling party information stored in the memory means, to thereby discriminate the attribute of the inputted calling party information. A call notice is generated which is assigned to the discriminated attribute by the call notice generating means. Therefore, by storing the calling party discrimination information while classifying it into a plurality of attributes, it becomes possible to generate upon call reception a call notice assigned to the attribute of the received calling party discrimination information. Accordingly, a user can discriminate based on the call notice whether or not the call was directed to himself, thus advantageously realizing a proper response by the user.

[Third Embodiment]

The third embodiment will be described wherein the information on the name of an individual person or a company of a calling party previously stored in association with the telephone number of the calling party is displayed upon call reception.

The third embodiment of this invention will be described in detail with reference to the accompanying drawings.

Figure 10B:
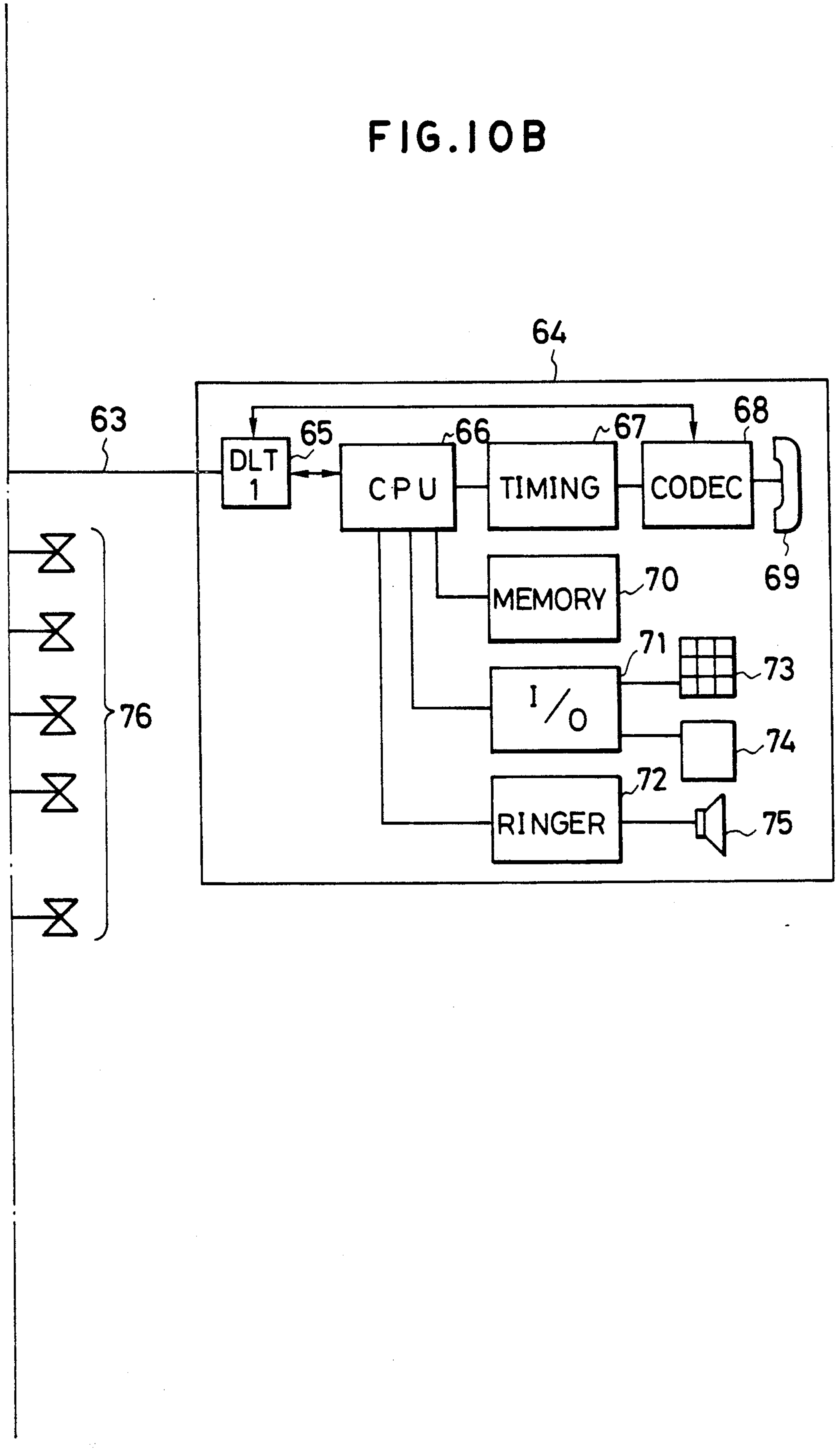

FIG. 10 is a block diagram showing a key telephone set according to the third embodiment. In FIG. 10, reference numeral 51 represents an analog telephone network, 52 an ISDN, 53 a main unit, 54 an analog interface, 55 an ISDN interface, 56 a codec, 57 a timing circuit, 58 a CPU for controlling the entirety of the main unit, 59 a time switch (MTS), 60 a RAM used as a working area for CPU 58 which executes various processes, 61 a ROM for storing the process procedure to be executed by CPU 58 which procedure will be later described, 62 a master digital transfer interface (DLT), 63 an extension line, 64 a digital telephone set, 65 a slave digital transfer interface (DLT), 66 a CPU for controlling the digital telephone set 64, 67 a timing circuit, 68 a codec, 69 a handset, 70 a memory, 71 an input/output interface (I/0), 72 a ringer, 73 a key pad unit, 74 a display, 75 a loudspeaker, 76 an extension telephone set similar to the telephone set 64.

Digital data composed of sounds and control data are time divisionally multiplexed for "ping-pong data transfer" on the transmission line 63 shown in FIG. 10.

Figure 13:
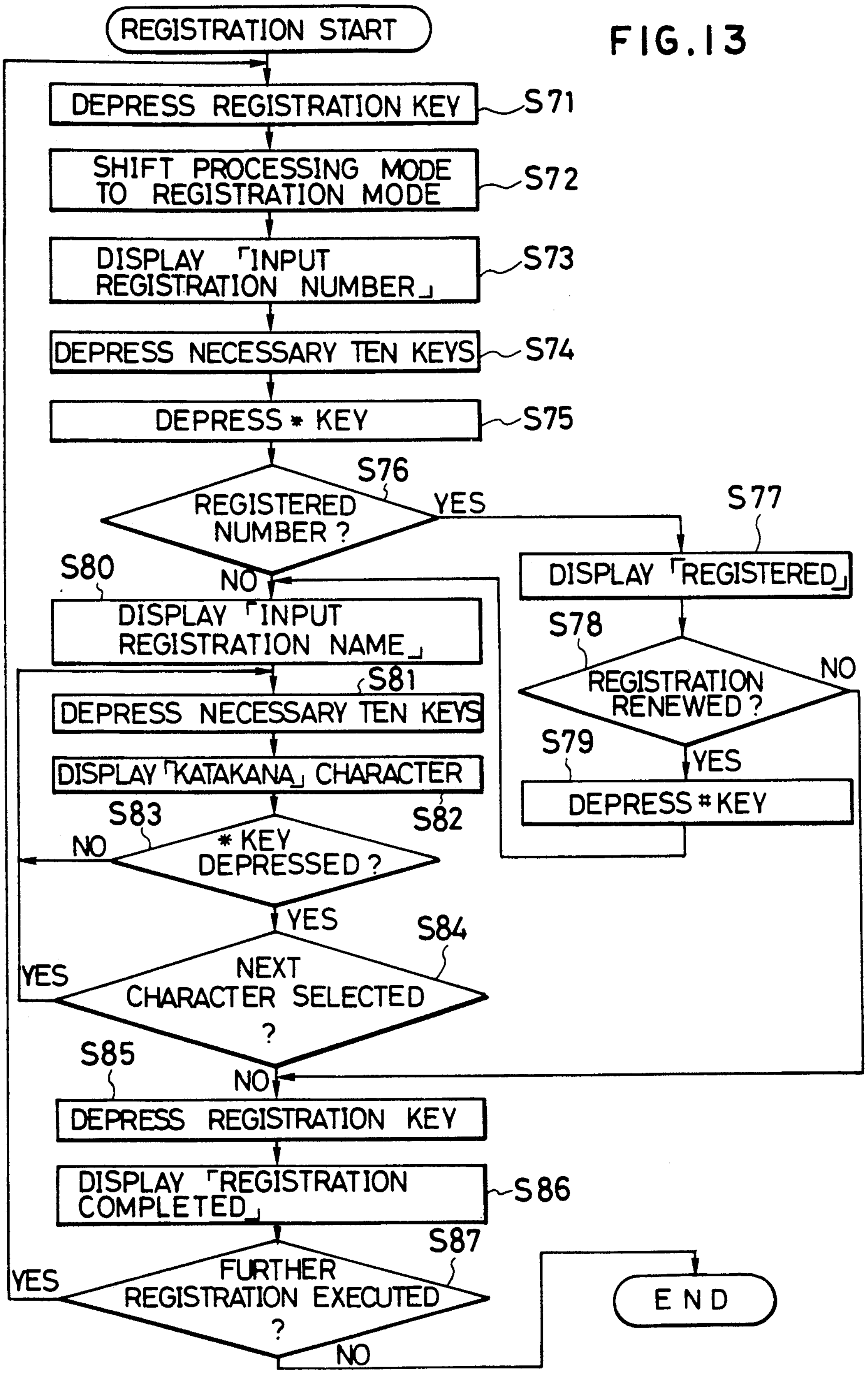
FIG. 13 is a flow chart showing the processes of registering calling party telephone number information according to the third embodiment of this invention.

Next, there will be described with reference to FIGS. 11 to 13 the method of previously registering a calling party telephone number and name so that the calling party name can be displayed upon reception of a calling party telephone number, with the aid of services given by the ISDN.

The diagram of FIG. 11 conceptually shows a registration table in RAM 60 in which a plurality of name data 77 and telephone number data 78 are stored in one-to-one correspondence with each other. Characters, numerical numbers and the like in the memory and transmission line 63 are expressed in the binary coded data format.

FIG. 12 shows ten-keys which are used for registering data in the registration table. As shown in FIG. 12, keys "1 to 9, 0", "*" and "#" are respectively assigned specific katakana characters, and alphabetical characters. These katakana and alphabetical characters can be registered upon changing the operation mode.

Next, the method of registering the name data 77 and number data 78 shown in FIG. 11 by using the extension telephone set 64 of this embodiment will be described with reference to the flow chart shown in FIG. 13.

The registration process starts upon depression of a "registration" key (not shown) on the extension telephone set 64 (step S71). Next, CPU 58 in the main unit 53 which receives the key code of the registration key causes the processing mode of the extension telephone set 64 to shift to the registration mode (step S72), and transmits a display instruction to the extension telephone set 64. Upon reception of this display instruction, the extension telephone set 64 displays a message such as "Input Registration Number" on the display 74 (step S73). Then, a user registers the telephone number of an individual person whose name is desired to be displayed upon a call reception. In registering the telephone number, ten-keys shown in FIG. 12 are depressed as necessary (step S74).

The depression procedure for the case of a registration number "03-758-2111" and name "キヤノン" as shown in FIG. 11 is as follows.

It is judged as completion of an input when the last "*" key among the depressed keys "037582111*" is inputted (step S75). The inputted keys before the "*" key are binary coded and sent to the main unit 53. CPU 8 of the main unit 53 which received the inputted key data judges if the inputted key data correspond to a telephone number registered in the past (step S76). If it is the already registered number, an instruction to display "Registered" and "Name" is sent to the extension telephone set 64 (step S77) to thereby urge the operator to judge if the registration is renewed or not (step S78). If the registration is to be renewed, the operator depresses "#" key (step S79). The main unit 53 with this key code being inputted shifts to the name input mode and sends a display instruction to display "Input Registration Name" (step S80). If the registration is not renewed at step S78, the registration key is depressed (step S85) to terminate the registration process.

Alternatively, if it is judged at step S76 that the registration was not registered in the past, then the flow advances to step S80 and the name input mode is entered. In this name input mode, the katakana and alphabetical characters of the ten-keys described before are displayed on the display 74. Namely, if a character to be registered is present in the "ア" column, "1" key is depressed. When "1" key is depressed one time, "ア" is displayed. Each time "1" key is depressed thereafter, characters "イ", "ウ", "エ", and so on are sequentially displayed. Upon depression of "*" key when the character to be inputted is displayed (step S83), the displayed character is selected and registered. Then, the following characters are selected in the similar manner. If the inputted character is desired to be corrected "#" key for reversing one character is depressed so that the preceding characters can be displayed and corrected (step S84).

After inputting all the characters necessary for the name by repeating the above operations, the registration key is depressed (step S85) so that the codes of the inputted character string are sent to the main unit 53 which in turn stores the codes in the registration table shown in FIG. 11 and sends a display instruction to display "Registration Completed" to the extension telephone set 64 (step S86). If a new registration is further desired, the registration key is depressed again to continue the registration process.

For inputting the name "[illegible]" in this embodiment, the keys are depressed in the order of "22*8*5*00* Registration key".

Figure 14:
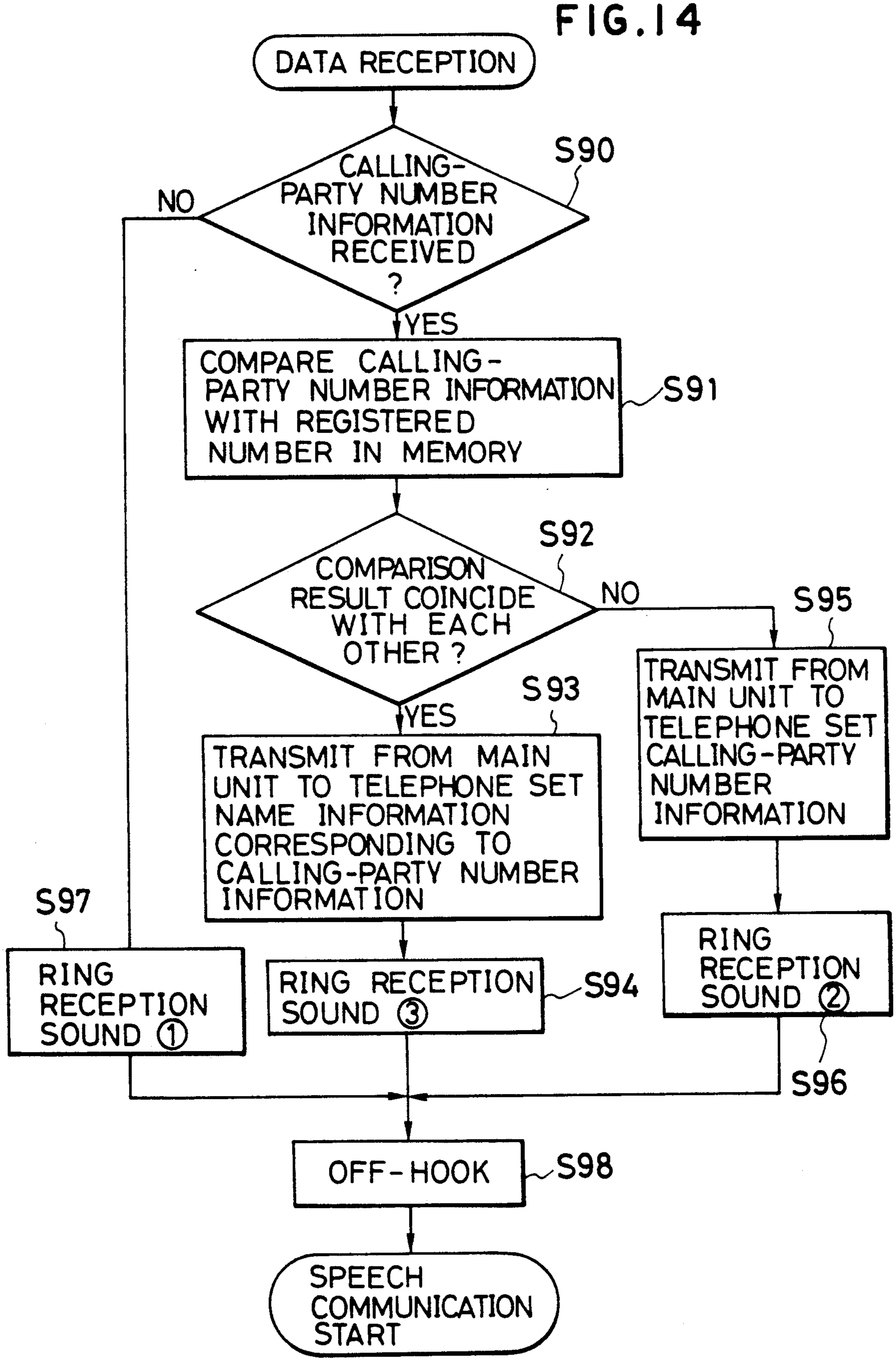
FIG. 14 is a flow chart showing the processes of receiving a call according to the third embodiment of this invention.

Next, the call reception process of the key telephone set of this embodiment will be described with reference to the flow chart shown in FIG. 14.

A call from the external line is detected with the analog interface 54 or ISDN interface 55 and the received information is analyzed at step S90. In this case, if the call, whether it is from the analog network or ISDN, is from a calling party which does not send calling party number information, then the flow advances to step S97 whereat a command is sent for making the called party extension telephone sets 64 and 76 ring with a calling sound ① in the similar manner as of the conventional key telephone set only connected to the analog network. Alternatively, if the calling party information received at step S90 contains the calling party number information, the flow advances to step S91 whereat the previously registered "number data" are compared with the received calling party number information. It is judged at step S92 if the comparison result indicates that the received calling party number is registered or not. If not, at step S95 only the calling party number information is sent to the called party extension telephone sets 64 and 76. At the next step S96, a command is sent for making the telephone sets ring with a calling sound ② representative of that the number of the calling party is not registered.

Alternatively, if the calling party number information received at step S92 is coincident with the "number data", the flow advances to step S93 whereat sent to the called party extension telephone sets 64 and 76 are the calling party number information and the registered "name" information assigned to the number information to thereby make the telephone sets ring with the calling sound ③ at step S94.

Next, at step S98, in accordance with the calling sounds ① to ③ or the call reception display, any one who can respond to the call takes off the handset from the hook to enter into a speech communication state. The processes after entering the speech communication state are the same as the conventional key telephone set, so the description is omitted in this embodiment.

According to the above embodiment, a call from the external line can be immediately identified as to the calling party name so that a most suitable person can respond to the call without unnecessary operation by other persons. Therefore, the efficiency of office work can be improved.

Further, according to the above embodiment, the called party can mentally prepare for responding to the call.

In the above embodiment, ten-keys are used for inputting characters. However, characters may be inputted by additionally using function keys, or by providing alphabetical keys.

Although the above embodiment uses a digital telephone (voices are digitized within the set) as an extension telephone set, an analog telephone set may be used with the same advantageous effects of this embodiment.

Further, in the above embodiment, the calling sound is changed depending on the presence/absence of calling party number information. This is also possible by changing the color of LEDs while retaining the same advantageous effects of this embodiment.

Furthermore, in this embodiment, although a name is represented with only katakana and alphabetical characters, it may also be represented with additional hiragana and kanji characters, with further advantageous effects being expected.

[Fourth Embodiment]

The fourth embodiment will be described wherein shown are an example of a circuit connection through selection of an extension line corresponding to calling party number information, and an example of transferring to a transfer destination corresponding to calling party number information.

Figure 15:
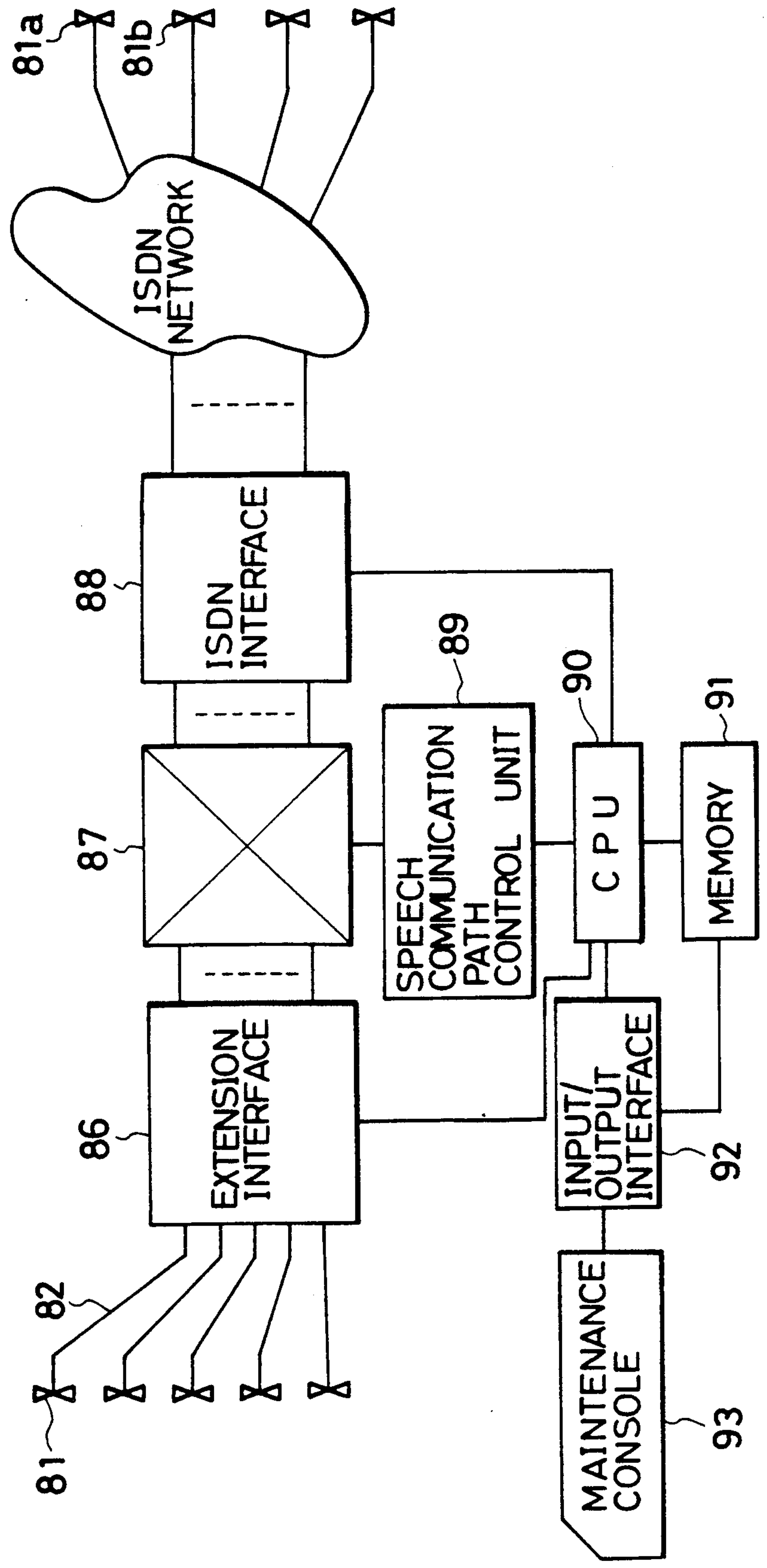
FIG. 15 is a block diagram showing an exchange according to a fourth embodiment of this invention.

FIG. 15 is a block diagram showing an exchange according to the fourth embodiment. In FIG. 15, reference numeral 81 represents an extension telephone set, 82 an extension line connected to an extension telephone set, 86 an extension interface for controlling each extension telephone set 81, 87 a time division speech communication path, 88 an ISDN interface, 90 a CPU for controlling the entirety of the apparatus, 91 a memory for storing CPU programs to be described later and various information, 92 an input/output interface, and 93 a maintenance console for inputting setting information to be described later.

Next, a call reception ringing system of this embodiment will be described with reference to FIGS. 16 and 17.

FIG. 16 shows the format of a data area in the memory 91. Stored in the data area are a memory 101 for storing a "calling party number" and a memory 104 for storing a "ringing extension number", a pair of memories 102 and 105, and a pair of memories 103 and 106.

The "calling party number" and "ringing extension number" set in memories 101 to 106 are inputted by using the maintenance console 93 and stored beforehand via the input/output interface 92 into the memory 91. FIG. 16 shows, for example, that a "calling party number" of "1234567" is stored in the memory 101. It is arranged such that the extension number ("1" to "5" in this embodiment) can be set in the paired memory 104 for storing a "ringing extension number". Stored in the memory 106 for storing a "ringing extension number" is the information in accordance with which the extension telephone sets whose extension numbers are "1" and "2" among the telephone sets 81 connected to the extension lines 82 are caused to ring. Upon reception of a call for the "calling party number" of "9999999", only the extension telephone sets with extension numbers "1" and "2" are caused to ring.

Figure 17:
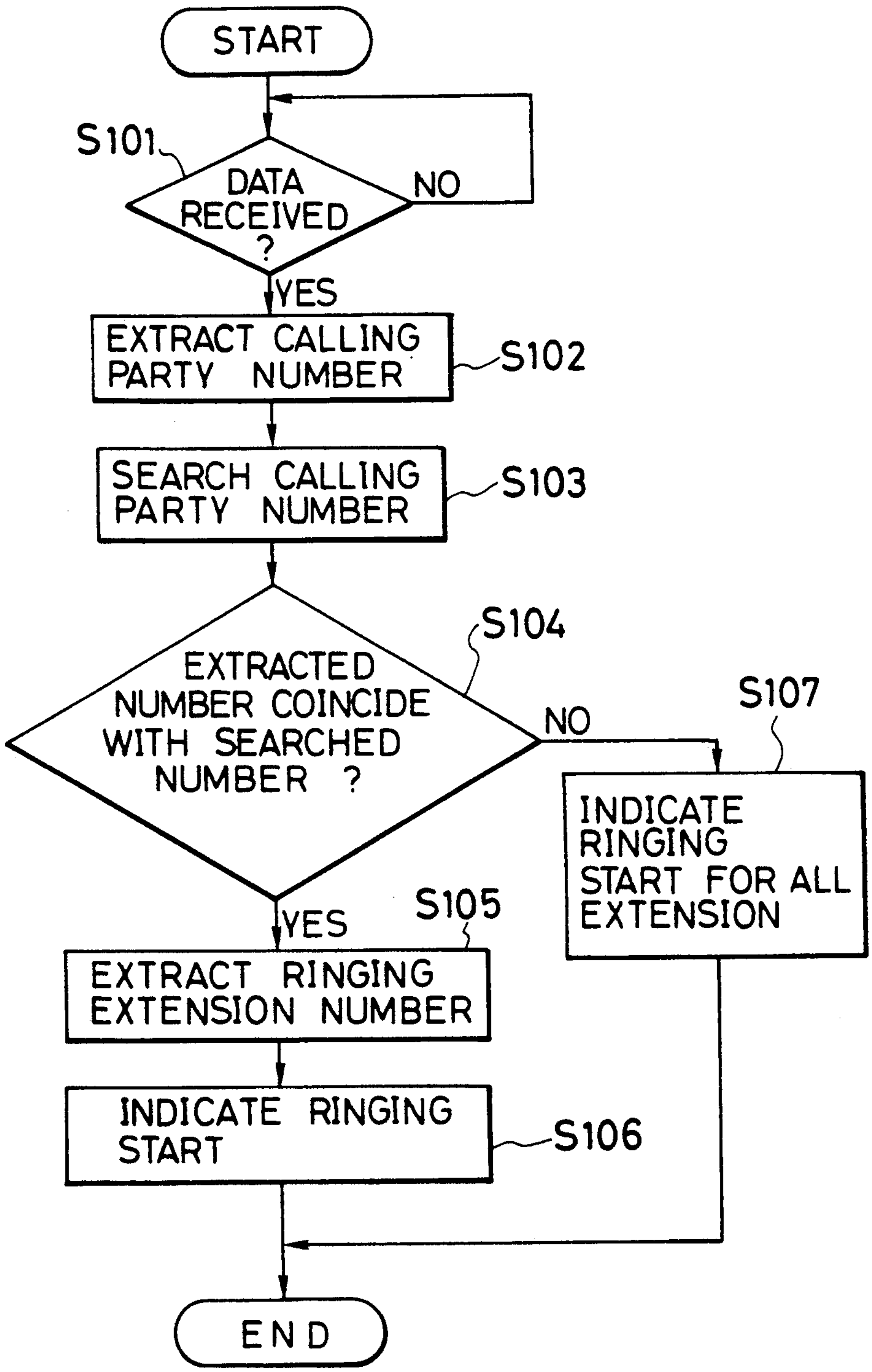
FIG. 17 is a flow chart showing the procedure of processes in the call reception ringing system according to the fourth embodiment of this invention.

FIG. 17 is a flow chart illustrating the operation under procedure programs of this embodiment.

First at step S101, the ISDN interface 88 waits for a detection of a call reception from the ISDN. Upon detection of a call, at step S102 the calling party number sent from the ISDN is extracted. At step S103, the extracted calling party number is compared with the "calling party numbers" stored in the memories 101 to 103 to search the coincident data at step S103. If there is coincident data, the extension numbers in the corresponding memory are extracted at step S105.

For instance, if a calling party number of "1234567" is sent from the ISDN, the number is coincident with the content in memory 101. Therefore, the extension numbers "1" to "5" in the memory 104 corresponding to the memory 101 are extracted. At step S106, CPU 90 instructs the extension interface 86 to ring the extension telephone sets with the extension numbers "1" to "5" via the extension lines 82.

Alternatively, if there is no coincident data at step S104, the flow advances to step S107 whereat in this embodiment all the extension telephone sets are caused to start ringing. In the similar manner, if the calling party number is coincident with the content of the memory 102, only the extension telephone set with extension number "5" is caused to ring. Also, if the calling party number is coincident with the content of the memory 103, the extension telephone sets with extension numbers "1" and "2" are caused to ring.

As described so far, there is provided means for previously storing a "ringing extension number" paired with a "calling party number". A calling party number sent from the ISDN is compared with the previously stored calling party numbers. If a coincidence is met, the corresponding particular extension telephone set or sets only are caused to ring.

Accordingly, call reception ringing can be effected independently for respective calling parties, thus enabling various call reception response methods without ringing the extension telephone sets not associated with the calling party.

Next, the call reception transfer system of this embodiment will be described with reference to FIGS. 18 and 19.

FIG. 18 shows the format of a data area in the memory 91 similar to FIG. 16. Stored in the data area are a pair of a memory 111 for storing a "calling party number" and a memory 114 for storing a "transfer destination number", a pair of memories 112 and 115, and a pair of memories 113 and 116.

The "calling party number" and "transfer destination number" set in the memories 111 to 116 are inputted by using the maintenance console 93 and stored beforehand via the input/output interface 92 into the memory 91. FIG. 16 shows, for example, that a "calling party number" of "12345678" is stored in the memory 111. It is arranged such that the transfer destination number "15551111" is stored in the paired memory 114 storing a "transfer destination number".

Figure 19:
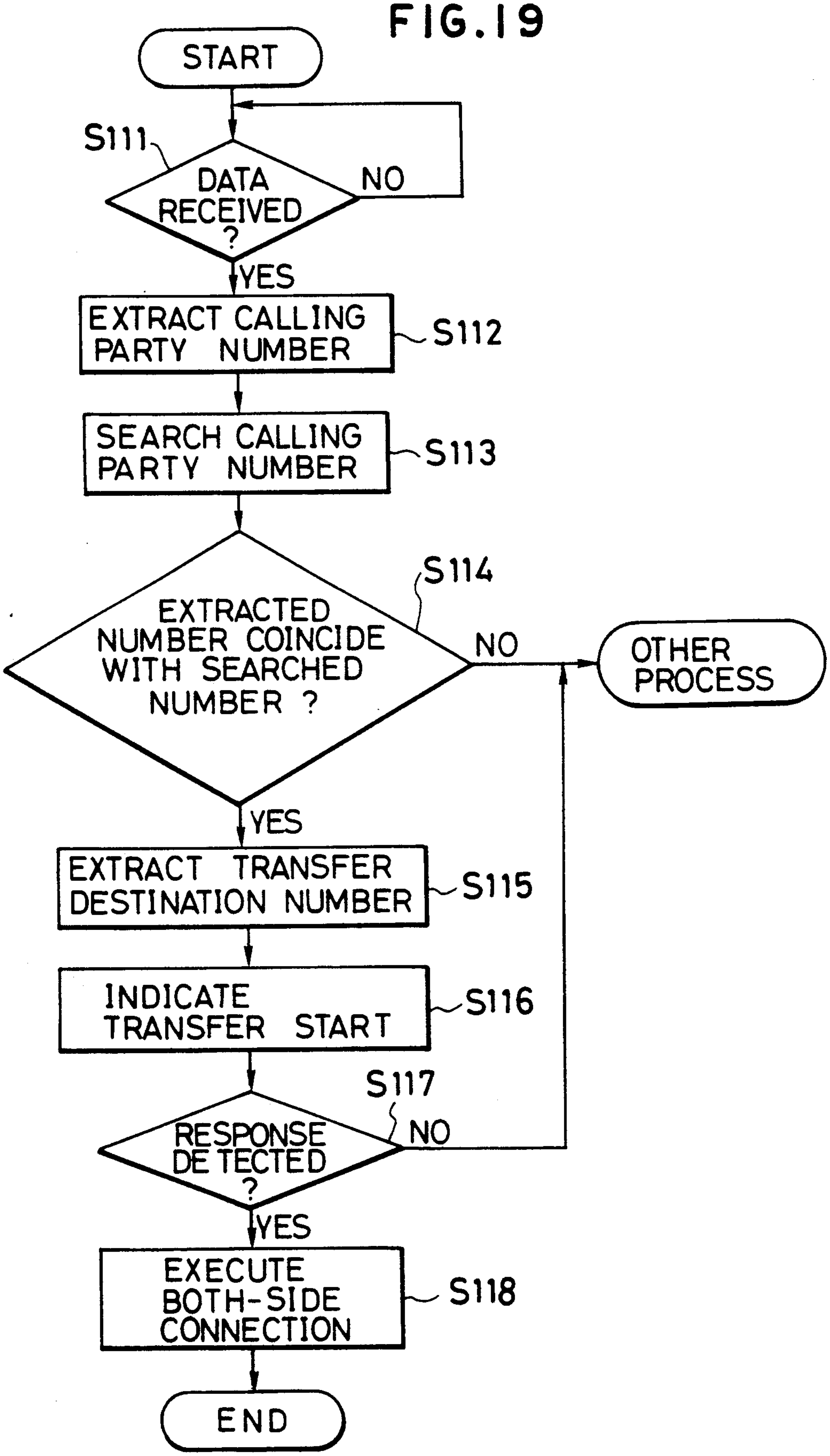
FIG. 19 is a flow chart showing the procedure of processes in the call reception transfer system according to the fourth embodiment of this invention.

FIG. 19 is a flow chart illustrating the operation under procedure programs of this embodiment.

It is now assumed that the ISDN terminal number of the telephone set 81*a* shown in FIG. 15 is "12345678", and that of the telephone set 81*b* is "15551111". Upon reception of a call from the telephone set 81*a*, a call reception state at step S111 is released, and the flow advances to step S112. At this call reception step, a call reception from the telephone set 81*a* is detected with the ISDN interface 88 which then outputs a detection signal to CPU 90. Next, at step S112, the ISDN terminal number of the calling party telephone set 81*a* is extracted, which number is "12345678" in this embodiment example as described previously.

Next, at step S113, the extracted calling party number "12345678" is compared with the "calling party numbers" set in the memories 111 to 113 to search a coincident number. In this embodiment example, the coincident number is present in the contents of the memory 111, so the flow advances to step S115. If not coincident, another process is performed such as ringing all the extension telephone sets within the exchange, or other processes. At step S115, the content "15551111" in the memory 114 paired with the memory 111 is extracted. Next, at step S116, the ISDN interface 88 is instructed to start a transfer operation, and the "transfer destination number" of "15551111" is sent to the ISDN and hence to the telephone set 81*b* at the ISDN terminal. The processes thereafter include, as well known, detection of a response by the telephone 81*b* (step S117), execution of both-side connection of the reception call from the telephone set 81*a* and the transfer call to the telephone set 81*b* via the time division speech communication path 87 (step S118), and other processes, to thereafter terminate the transfer operation.

As described so far, there is provided means for storing a "calling party number" and storing beforehand a corresponding "transfer destination number". After detecting a call reception from the ISDN, the calling party number is extracted and compared with the previously stored "calling party numbers". Therefore, a reception transfer system can be realized whereby a call reception from a particular calling party can be transferred to a particular transfer destination. Thus, the person who registered the transfer registration destinations can transfer only those calls from desired calling parties.

As appreciated from the foregoing description of the first to fourth embodiments of this invention, various services are possible by using calling party number information sent from the apparatus of the calling party, thus considerably improving the workability of an operator.

In the above-described embodiments, a telephone set has been used as an example of a communication apparatus. The present invention is also applicable to a facsimile apparatus for image data communication, and a telex for character code data communication.

Further, in the embodiment shown in FIG. 9, the calling party telephone number in association with a one-touch key has been exemplarily described. This example is also applicable to the embodiments shown in FIGS. 11, 16 and 18.

The present invention has been described with reference to the preferred embodiments. This invention however is not intended to be limited thereto, but various modifications are possible which should be construed as falling within the scope of the appended claims.

We claim:

1. A communication apparatus comprising:

memory means for storing calling-party information in association with calling-party information representing a called party, said memory means storing a first group of a plurality of sets of calling-party information in correspondence with a first called party and storing a second group of a plurality of sets of calling-party information in correspondence with a second called party;

comparing means for comparing calling-party information sent from a calling party with the calling-party information stored in said memory means, and for discriminating whether the calling-party information sent from the calling party belongs to the first group or the second group;

selecting means for selecting the first or the second called party corresponding to the calling-party information sent from the calling party, in accordance with a comparison result obtained by said comparing means;

generating means for generating a reception sound corresponding to the first or second called party selected by said selecting means, wherein said generating means generates, as well as a reception sound for all receptions to notify an operator of all receptions, a first reception sound when said comparing means detects that the calling-party information stored in said memory means does not coincide with the calling-party information sent from the calling party, and generates a second or third reception sound corresponding to the first or second called party selected by said selecting means when the first or second group of calling-party information stored in said memory means coincides with the calling-party information sent from the calling party; and reception process means for executing a reception process in accordance with a reception instruction provided by the operator, after said generating means generates the first, second or third reception sound.

2. A communication apparatus according to claim 1, wherein said communication apparatus is an apparatus connected to a communication network having a function to transmit calling party information.

3. A communication apparatus according to claim 2, wherein said communication network is an integrated service digital network.

4. A communication apparatus according to claim 1, wherein said memory means additionally stores one-touch or key dial information in association with said calling party information.

* * * * *

UNITED STATES PATENT AND TRADEMARK OFFICE

CERTIFICATE OF CORRECTION

PATENT NO. : 5,267,307

DATED : November 30, 1993

INVENTOR(S) : MICHIHIRO IZUMI ET AL.

It is certified that error appears in the above-identified patent and that said Letters Patent is hereby corrected as shown below:

On the title page:

Item: [56] REFERENCES CITED

U.S. Patent Documents,
"4,567,323 9/1986 Lottes et al." should read
--4,567,323 1/1986 Lottes et al.--.

COLUMN 6

Line 49, "execute," should read --execute--.

Signed and Sealed this

Twenty-eighth Day of June, 1994

Attest:

BRUCE LEHMAN

*Attesting Officer* — *Commissioner of Patents and Trademarks*